United States Patent
Chen et al.

(10) Patent No.: US 12,499,261 B2
(45) Date of Patent: Dec. 16, 2025

(54) METHOD, SYSTEM, AND STORAGE MEDIUM TO SAFEGUARD FILES FROM UNAUTHORIZED COPYING

(71) Applicant: INNODISK CORPORATION, New Taipei (TW)

(72) Inventors: Chao-Hung Chen, New Taipei (TW); Chung-Yi Lai, New Taipei (TW)

(73) Assignee: INNODISK CORPORATION, New Taipei (TW)

( * ) Notice: Subject to any disclaimer, the term of this patent is extended or adjusted under 35 U.S.C. 154(b) by 106 days.

(21) Appl. No.: 18/542,805

(22) Filed: Dec. 18, 2023

(65) Prior Publication Data
US 2025/0156569 A1 May 15, 2025

(30) Foreign Application Priority Data
Nov. 15, 2023 (TW) ................................. 112144115

(51) Int. Cl.
*G06F 21/62* (2013.01)

(52) U.S. Cl.
CPC ................................. *G06F 21/6218* (2013.01)

(58) Field of Classification Search
None
See application file for complete search history.

(56) References Cited

U.S. PATENT DOCUMENTS

| 7,032,089 | B1 * | 4/2006 | Ranade | G06F 11/2069 707/999.204 |
| 2004/0003398 | A1 * | 1/2004 | Donian | H04N 21/458 348/E7.071 |

FOREIGN PATENT DOCUMENTS

CN 102257506 A 11/2011

\* cited by examiner

*Primary Examiner* — Brandon Hoffman (57) ABSTRACT

A method for preventing a file to be protected, from being copied includes the steps of executing a prevention of replication application on a host to enable or disable a setting program, processing the file to be protected, and defining a supplementary protective zone after processing the file to be protected. The prevention of replication application of the host notifies firmware of a storage medium, of a predetermined logical block address corresponding to the supplementary protective zone by a communication connection, so as to complete a setting procedure for preventing the file to be protected, from being copied. When a data access address read by the host from the storage medium includes the predetermined logical block address, the firmware executing a pre-stored data blocking program so as to prevent the file to be protected, from being copied by the host.

10 Claims, 5 Drawing Sheets

METHOD, SYSTEM, AND STORAGE MEDIUM TO SAFEGUARD FILES FROM UNAUTHORIZED COPYING

CROSS-REFERENCE TO RELATED APPLICATION

This non-provisional application claims priority under 35 U.S.C. § 119(a) on Patent Application No(s). 112144115 filed in Taiwan, R.O.C. on Nov. 15, 2023, the entire contents of which are hereby incorporated by reference.

BACKGROUND OF THE INVENTION

1. Field of the Invention

The present disclosure relates to a system and a storage medium for protecting predetermined files, and in particular to a method, a system, and a storage medium to safeguard files from unauthorized copying.

2. Description of the Related Art

In the recent years, the Internet of Things (IoT) technology has developed rapidly in industry, significantly enhancing production efficiency and yield rate for the manufacturing industry, and at the same time reducing labor costs and saving time. Along with the development of IoT technology, machine-to-machine communications can be combined with technologies including automatic detection, optical image measurement, cloud computing, and artificial intelligence, further improving reliability and efficiency of the manufacturing industry, bringing immense convenience to people's lives.

Cloud computing technology includes computation processes using servers provided by cloud service providers. Cloud service providers can provide different data processing (for example, data computing, data analysis, and data storage) functions by using the cloud computing technology. The servers above are usually located in locations with low space costs and electricity costs, and perform data transmission with remote ends by using high-speed networks (for example, optical fiber networks). However, the above process of data transmission inevitably encounters transmission latency due to physical distances.

Thus, in order to reduce such transmission latency, edge computing devices have been developed. An edge computing device is a device that renders computing, analysis, and storage abilities for data to be closer to those at a location where the data is generated. Accordingly, by transferring the processes of data processing from a remote location to a location closer to a user, in addition to reducing the amount of computation performed by a remote end, the bandwidth requirement can be lowered to further provide faster and more immediate data processing ability.

However, data stored in an edge computing device usually includes highly commercially valuable application programs, artificial intelligence models, or medical records that require privacy protection. Thus, in order to protect data stored in an edge computing device from unauthorized copying, there is need for improved data protection techniques, data is protected by means of, for example, encrypting or decrypting predetermined data, identifying an authorized user using predetermined hardware circuits, and using predetermined characters or cyclic redundancy check (CRC) codes.

BRIEF SUMMARY OF THE INVENTION

However, among the above data protection techniques, the means of encryption and decryption occupies computing resources of an edge computing device and hence leads to an issue of affected performance. The means of identifying using predetermined hardware circuits requires additional hardware circuits and hence leads to an issue of increased construction costs of the edge computing device. The means of using predetermined characters or CRC codes may suffer from an issue of misjudgment in the case of, for example, parity check, which has an error detection rate of only around 50%.

To overcome the above issues, it is an object of the present disclosure to provide a method to safeguard files from unauthorized copying. In other words, the method prevents a file to be protected, from being copied. The method includes the steps of: executing a prevention of replication applications on a host to enable or disable a setting program, processing the file to be protected, and defining a supplementary protective zone after processing the file to be protected. The prevention of replication applications of the host notifying firmware of a storage medium, of a predetermined logical block address (LBA) corresponding to the supplementary protective zone by means of the communication connection, so as to complete a setting procedure for preventing the file to be protected, from being copied. When a data access address read by the host from the storage medium includes the predetermined logical block address, the firmware executes a pre-stored data blocking program so as to prevent the file to be protected, from being copied by the host.

In some embodiments, the file to be protected is stored in at least one storage region of the storage medium.

In some embodiments, the data blocking program includes causing the firmware to transmit false data to the host, causing the firmware to continue transmitting the false data to the host such that the host cannot end a data copy operation, causing the storage medium to not respond to any command from the host, deleting data stored in the at least one storage region, and formatting a portion or all of the storage medium so as to clear the data stored in the at least one storage region.

In some embodiments, the method further includes the host notifying firmware of the storage medium by the prevention of replication applications so as to disable the setting procedure.

It is another object of the present disclosure to provide a system to safeguard files from unauthorized copying. The system includes a host, installed with prevention of replication applications, for processing the file to be protected and defining a supplementary protective zone after processing the file to be protected. The system further comprises a storage medium, in a communication connection with the host, the storage medium having firmware and at least one storage region. The firmware allows prevention of replication applications to set a supplementary protective zone and a data blocking procedure, the at least one storage region for storing the file to be protected. The prevention of replication applications of the host notifies the firmware, of a predetermined logical block address corresponding to the supplementary protective zone by means of the communication connection, so as to complete the setting procedure for preventing the file to be protected, from being copied. When a data access address read by the host from the storage medium includes the predetermined logical address block, and the firmware executes the pre-stored data blocking procedure so as to prevent the file to be protected, from being copied by the host.

It is yet another object of the present disclosure to provide a storage medium for preventing a file to be protected, from being copied. The storage medium is suitable to be in a communication connection with a host installed with prevention of replication applications, wherein the host processes the file to be protected by the prevention of replication applications, and defines a supplementary protective zone after processing the file to be protected. The storage medium includes firmware, allowing the prevention of replication applications to set a supplementary protective zone and a data blocking procedure, and at least one storage region, electrically connected to the firmware, for storing the file to be protected. The prevention of replication applications of the host notifies the firmware, of a predetermined logical block address corresponding to the supplementary protective zone by means of the communication connection, so as to complete the setting procedure for preventing the file to be protected, from being copied. When a data access address read by the host from the storage medium includes the predetermined logical address block, the firmware executes the pre-stored data blocking procedure so as to prevent the file to be protected, from being copied by the host.

The method, system, and storage medium for preventing a file to be protected, from being copied achieve the object of data protection by means of collaboration of the prevention of replication applications and the storage medium. The present disclosure uses existing firmware in the storage medium to perform a setting/cancellation process to prevent a file to be protected, from being copied. Thus, compared to conventional techniques using modified or additional hardware circuits, costs of a storage medium are not increased. Moreover, compared to conventional means of using encryption and decryption, the present disclosure does not occupy an overly large amount of computing resources of a processor and hence does not affect apparatus performance. In addition, logical block addresses are unique and non-repetitive, and do not differ due to different operating systems (for example, Windows and Linux) or hardware structures (for example, X86 and ARM). Thus, compared to conventional means of using predetermined characters or CRC check codes, the occurrence and hence the issue misjudgment is eliminated. Accordingly, the object of cross-platform data protection is achieved in a low-cost and misjudgment-free manner without affecting performance.

DETAILED DESCRIPTION OF THE INVENTION

To facilitate understanding of the object, characteristics, and effects of this present disclosure, embodiments together with the attached drawings for the detailed description of the present disclosure are provided.

Figure 1:
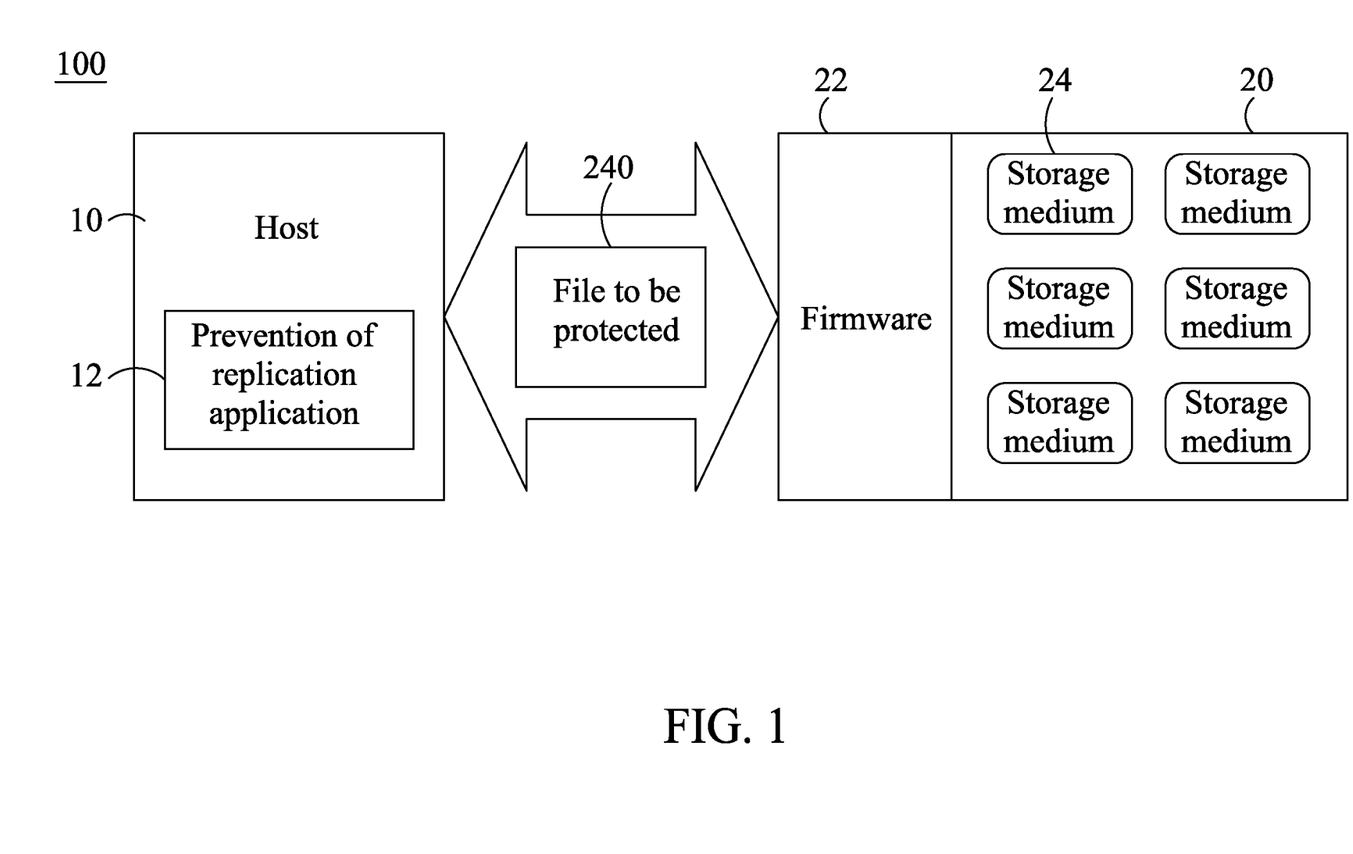
FIG. 1 is a block diagram of a system for preventing a file to be protected, from being copied according to an embodiment of the present disclosure.

FIG. 1 shows a block diagram of a system 100 for preventing a file to be protected, from being copied according to an embodiment of the present disclosure. The system 100 for preventing a file to be protected, from being copied includes a host 10 and a storage medium 20.

The host 10 is installed with a prevention of replication application 12. The prevention of replication application 12 can be used to enable or disable a setting procedure, process a file to be protected 240, and define a supplementary protective zone 242 after processing the file to be protected 240. The prevention of replication application 12 has permission for accessing firmware 22 of the storage medium 20, and is considered as a predetermined application program. For example, the prevention of replication application 12 can provide a user operation interface at the host 10 to allow a user to freely select and designate a file to be protected to be stored in the storage medium 20, so as to define the file to be protected 240. The prevention of replication application 12 is a predetermined application program that can match with the storage medium 20. Thus, if only one of the prevention of replication application 12 and the storage medium 20 is obtained, a setting/cancellation procedure for preventing a file to be protected, from being copied cannot be implemented. Thus, an individual who illegally obtains the storage medium 20 is prevented from stealing the file to be protected 240 stored in the storage medium 20, hence enhancing security of data protection.

The host 10 can include an apparatus having basic functions including data computing, analysis and storage, such as an operating system (for example, Windows, Linux, Unix and QNX), a processor (for example, x86 architecture, ARM architecture, MIPS architecture, CISC architecture, RISC architecture, neural-network processing unit (NPU) architecture), a storage device (not shown), and a communication circuit (not shown). The processor can be a central processing unit (CPU), or other programmable general-purpose or application-specific micro control unit (MCU), application-specific integrated circuit (ASIC), graphics processing unit (GPU), image signal processor (ISP), image processing unit (IPU), microprocessor, digital signal processor (DPS), programmable controller, or field programmable gate array (FPGA), or a combination of similar elements or the elements above.

The storage medium 20 is in a communication connection with the host 10. The communication connection can be implemented by, for example, a wired transmission means or a wireless transmission means. The wired transmission means can transmit data by using communication standards or interfaces such as Integrated Drive Electronics (IDE), Universal Serial Bus (USB), Small Computer System Interface (SCSI), Serial Advanced Technology Attachment (SATA), and Peripheral Component Interconnect Express (PCI Express). The wireless means can transmit data by communication standards such as Wi-Fi.

The storage medium 20 can include firmware 22 and one or more storage regions 24. In an embodiment, the firmware 22 allows the prevention of replication application 12 installed on the host 10 to perform setting of a supplementary protective zone and a data blocking procedure. The firmware 22 can pre-store a program code capable of executing the data blocking procedure. The data blocking procedure can have priority for blocking or omitting a command from the host 10, so as to prevent the file to be protected 240, from being copied by the host 10. The one or more storage regions 24 can store data such as the file to be protected 240, the file to be protected 240 having been processed, application programs, and/or artificial intelligence models. The storage medium 20 can be, for example, a random access memory (RAM), read-only memory (ROM), flash memory, hard disk drive (HDD), solid-stage drive (SSD), or a combination of similar elements or the elements above. In an example, an SSD is given. Moreover, the storage medium 20 further includes a communication circuit/interface that matches with the host 10, and associated details are generally known to a person skilled in the art and are omitted herein.

Figure 2A:
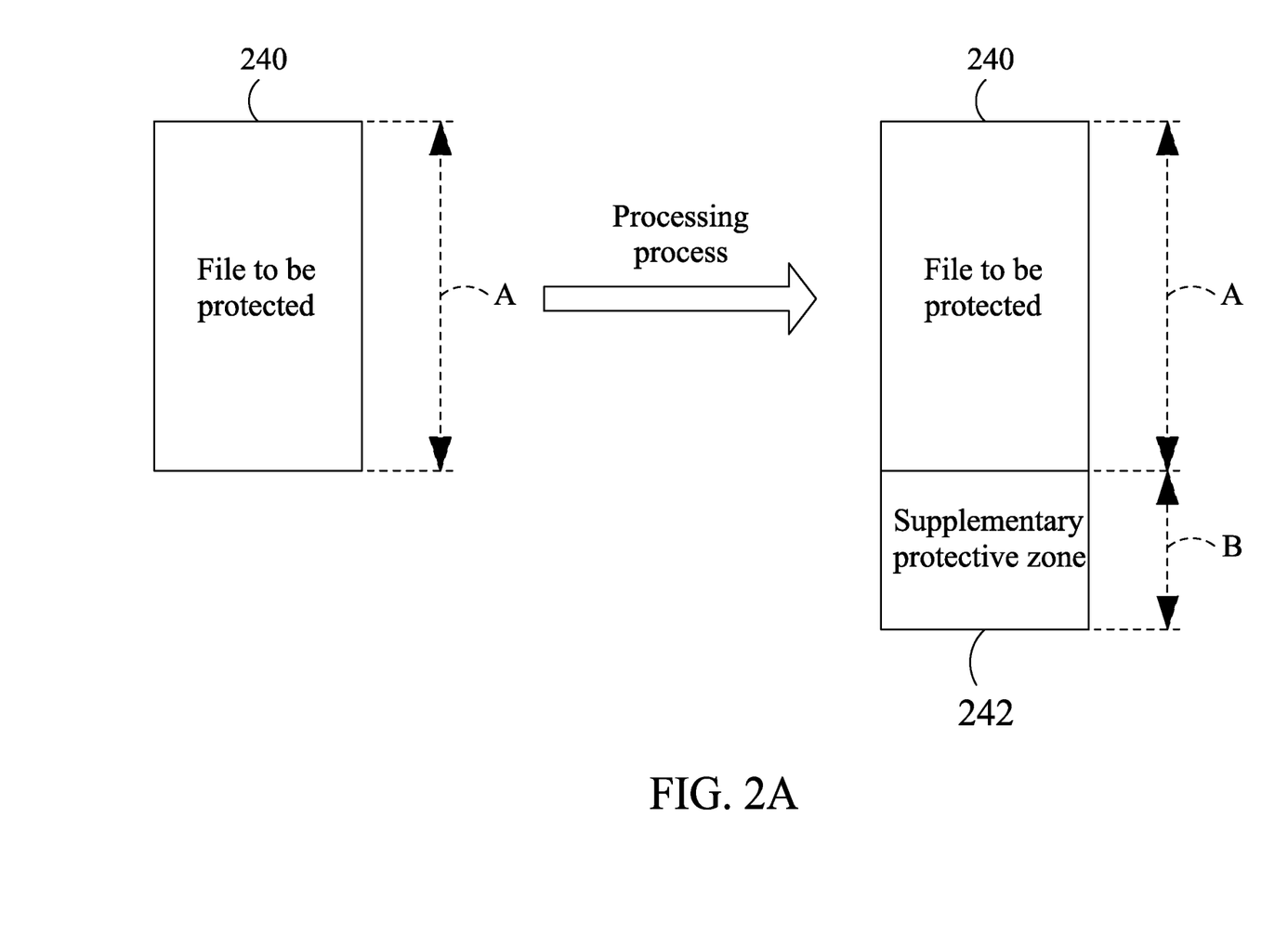
FIG. 2A is a schematic diagram of performing a processing process on a file to be protected according to an embodiment of the present disclosure.

Refer to FIG. 2A showing a schematic diagram of performing a processing process on the file to be protected 240 according to an embodiment of the present disclosure. When the host 10 executes the prevention of replication application 12 to process the file to be protected 240, the file to be protected 240 has a first file capacity A (for example, 5 MB). A supplementary protective zone 242 is defined after the file to be protected 240 is processed, wherein the supplementary protective zone 242 has a second file capacity B (for example, 1 KB). The first file capacity A can be, for example but not limited to, greater than or equal to the second file capacity B. The supplementary protective zone 242 can correspond to a predetermined logical block address. Storage contents of the supplementary protective zone 242 can be, for example, description data that does not affect a program execution result. Thus, the supplementary protective zone 242 of an embodiment of the present disclosure does not occupy an overly large storage space of the storage medium 20, and achieves the object of data protection.

Next, the host 10 can notify the firmware 22 of the storage medium 20, of the predetermined logical block address corresponding to the supplementary protective zone 242 by the prevention of replication application 12 by means of the communication connection, so as to complete the setting procedure for preventing a file to be protected, from being copied. In some embodiments, the host 10 can notify the firmware 22 of the storage medium 20 by the prevention of replication application 12 so as to disable the setting procedure. In other embodiments, the prevention of replication application 12 of an embodiment of the present disclosure can also be designated with or can automatically designate a logical block address to be set in the firmware 22 of the storage medium 20, as the predetermined logical block address. Logical block addresses are unique and non-repetitive. Thus, compared to conventional means of using predetermined characters or CRC codes, the occurrence and hence the issue misjudgment is eliminated.

When a data access address read by the host 10 from the storage medium 20 includes the predetermined logical block address, the firmware 22 executes the pre-stored data blocking procedure, so as to prevent the file to be protected 240, from being copied by the host 10. The data blocking procedure can be, for example, causing the firmware 22 to transmit false data (for example, blank data or randomly generated data) to the host 10. In some embodiments, the data blocking procedure can be, for example, causing the firmware 22 to continuously transmit false data to the host 10 such that the host 10 cannot end a file copy operation. Moreover, in the above embodiment in which false data is transmitted to the host 10, only a portion or a very small amount of computing resources of the host 10 is occupied.

In some embodiments, the data blocking procedure can be, for example, causing the storage medium 20 to not respond to any command from the host 10. In some embodiments, the data blocking procedure can be, for example, deleting data stored in the one or more storage regions 24. In some embodiments, the data blocking procedure can be, for example, formatting a portion or an entirety of the storage medium 20, so as to clear data stored in the one or more storage regions 24. The data blocking procedure can be executed on top of one another or executed separately.

Figure 2B:
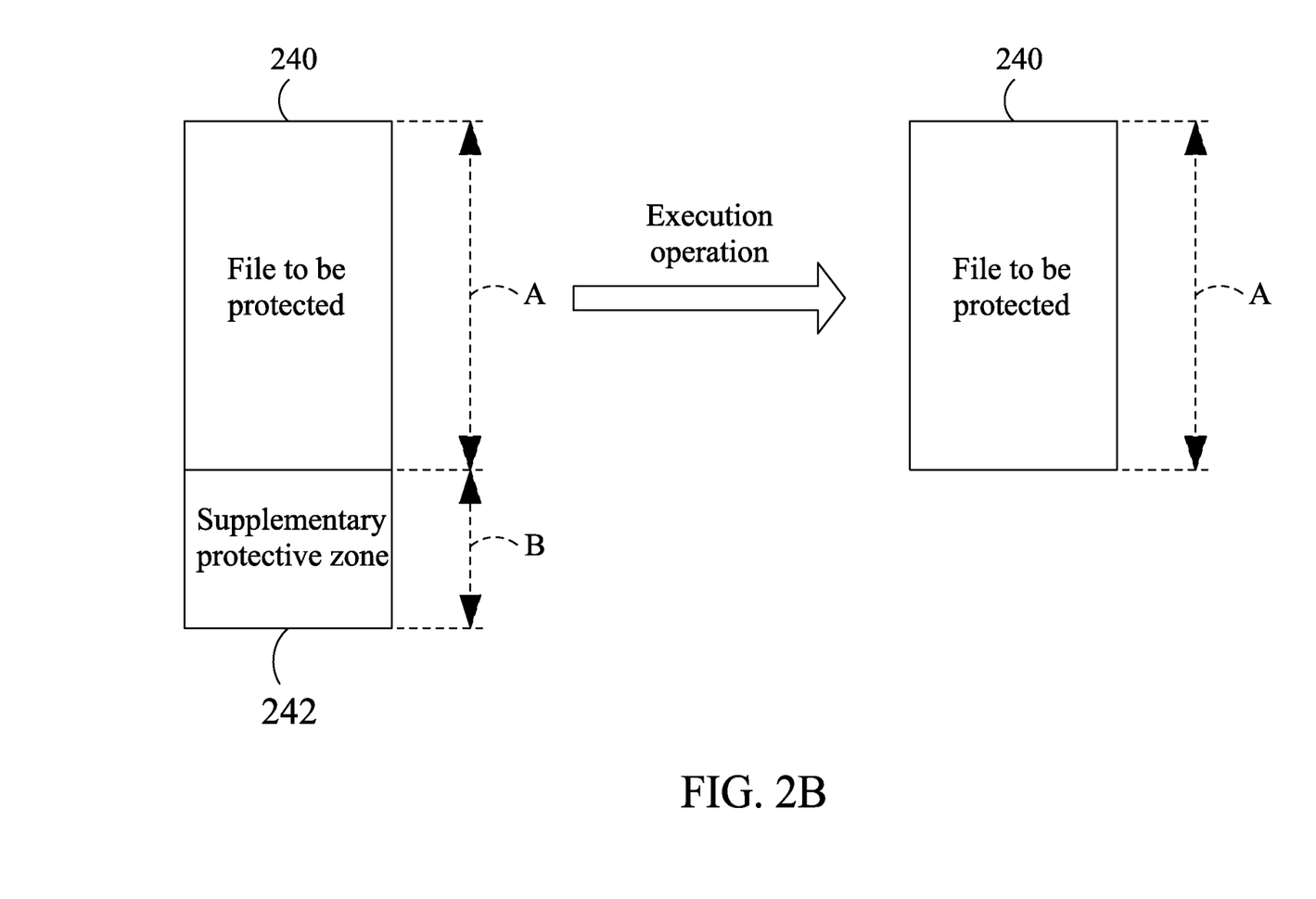
FIG. 2B is a schematic diagram of performing an execution operation on a file to be protected according to an embodiment of the present disclosure.

Refer to FIG. 2B showing a schematic diagram of performing an execution operation on the file to be protected 240 according to an embodiment of the present disclosure. When the host 10 performs an execution operation (for example, executing a file with a file extension ".exe"), a range of the logical block address of the file to be protected 240 read by the host 10 is within an original range of the first file capacity A, and a range of the second file capacity B of the supplementary protective zone 242 (corresponding to the right of the arrow in FIG. 2) is not touched. Thus, the host 10 is allowed to perform the execution operation of the required application program as normal.

Figure 2C:
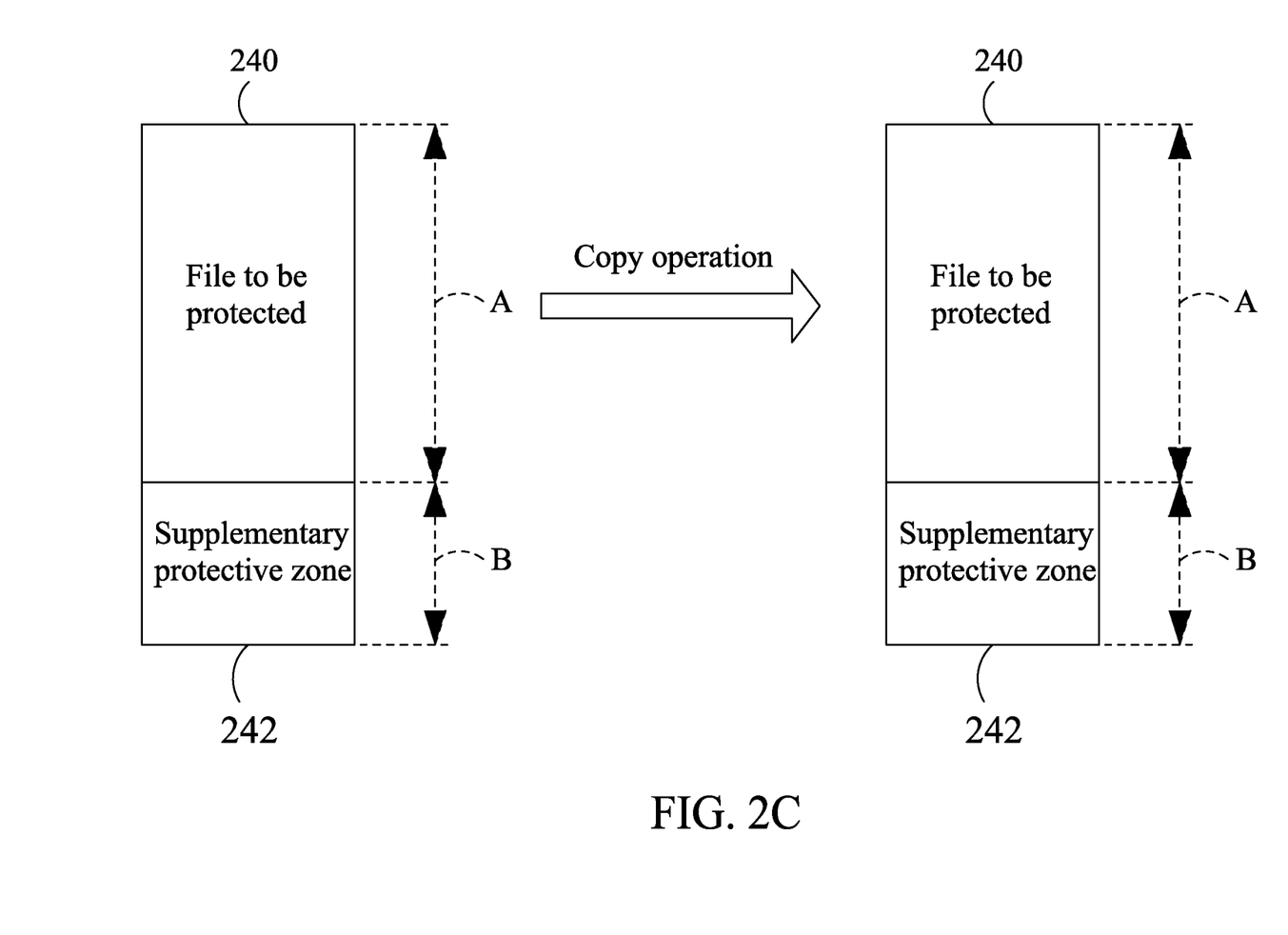
FIG. 2C is a schematic diagram of performing a copy operation on a file to be protected according to an embodiment of the present disclosure.

Refer to FIG. 2C showing a schematic diagram of performing a copy operation on a file to be protected according to an embodiment of the present disclosure. When the host 10 performs a copy operation, in addition to the original range of the first file capacity A, a range of the logical block address of the file to be protected 240 read by the host 10 further includes a range of the second file capacity B of the supplementary protective zone 242 (corresponding to the right of the arrow in FIG. 2C). At this point, the firmware 22 immediately triggers the pre-stored data blocking procedure so as to prevent the file to be protected 240, from being copied by the host 10.

Figure 3:
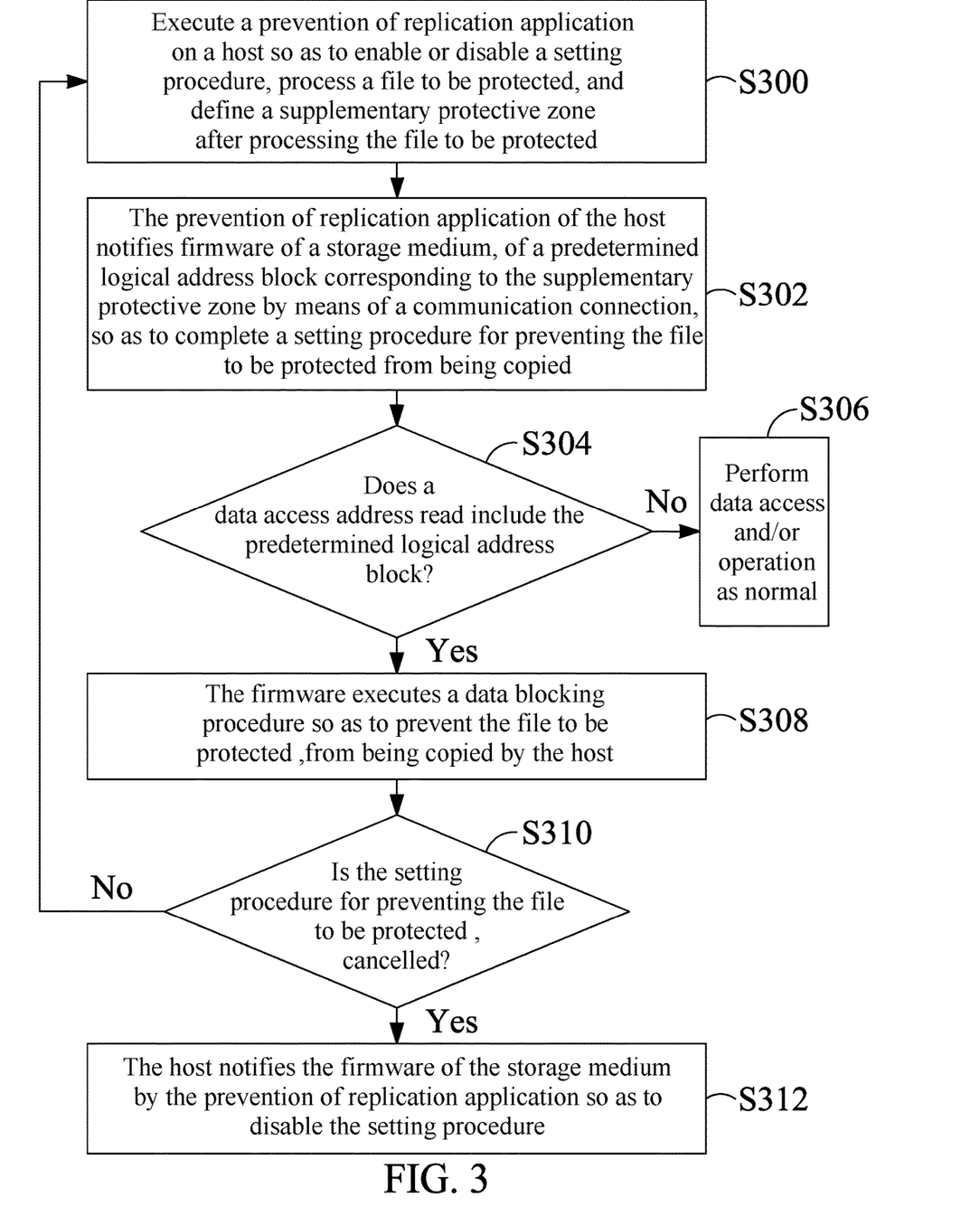
FIG. 3 is a flowchart of a method for preventing a file to be protected from being copied according to an embodiment of the present disclosure.

Refer to FIG. 3 showing a flowchart of a method for preventing a file to be protected, from being copied according to an embodiment of the present disclosure. In step S300, the prevention of replication application 12 is executed on the host 10 so as to process the file to be protected 240, and the supplementary protective zone 242 is defined after processing the file to be protected 240.

In step S302, the prevention of replication application 12 of the host 10 notifies a record of the firmware 22 of the storage medium 20, of the predetermined logical block address corresponding to the supplementary protective zone 242 by means of the communication connection, so as to complete the setting procedure for preventing a file to be protected, from being copied.

In step S304, it is determined whether the data access address read from the storage medium 20 by the host 10 includes the predetermined logical block address. When it is determined that the data access address read from the storage medium 20 by the host 10 includes the predetermined logical block address, step S308 is performed. When it is determined that the data access address read from the storage medium 20 by the host 10 does not include the predetermined logical block address, step S306 is performed.

In step S306, the host 10 can perform a data access and/or an operation on the storage medium 20 as normal. Once a provider of an apparatus (for example, an edge computing device) completes the setting procedure for preventing the file to be protected 240, from being copied, the apparatus can be provided to a user. Thus, for a user of the apparatus, operation behaviors of the host 10 do not need to be changed although the apparatus is built with the system 100 for preventing a file to be protected, from being copied, and ease of use of the apparatus can still be preserved.

In step S308, the firmware 22 executes the pre-stored data blocking procedure so as to prevent the file to be protected 240, from being copied by the host 10. Thus, when the host 10 performs a copy operation, it can be determined whether the copy operation is an illegal behavior to immediately trigger a data protection mechanism (that is, the data blocking procedure), further preventing the file to be protected 240, from being stolen from the storage medium 20 to the host 10.

In step S310, it is determined whether the host 10 cancels the setting procedure for preventing a file to be protected, from being copied. When it is determined that the host 10 cancels the setting procedure for preventing a file to be protected, from being copied, step S312 is performed. When it is determined that the host 10 does not cancel the setting procedure for preventing a file to be protected, from being copied, the method returns to step S300.

In step S312, the host 10 notifies the firmware 22 of the storage medium 20, of the predetermined logical block address by the prevention of replication application 12 by means of the communication connection, so as to disable the setting procedure. It should be noted that, the enabling or disabling of the setting procedure for preventing a file to be protected, from being copied of the embodiment of the present disclosure can be performed at any timing instead of being performed at a predetermined timing or in predetermined time period, so as to reduce operation complications and enhance ease of operation.

In conclusion, the method, system and storage medium for preventing a file to be protected, from being copied achieve the object of data protection by means of collaboration of the prevention of replication application 12 and the storage medium 20. The present disclosure uses existing firmware 22 in the storage medium 20 to perform a setting/cancellation process to prevent a file to be protected, from being copied. Thus, compared to conventional techniques using modified or additional hardware circuits, costs of the storage medium 20 are not increased. Moreover, compared to conventional means of using encryption and decryption, the present disclosure does not occupy an overly large amount of computing resources of a processor and hence does not affect apparatus performance. In addition, logical block addresses are unique and non-repetitive, and do not differ due to different operating systems (for example, Windows and Linux) or hardware structures (for example, X86 and ARM). Thus, compared to conventional means of using predetermined characters or CRC check codes, the occurrence and hence the issue misjudgment is eliminated. Accordingly, the object of cross-platform data protection is achieved in a low-cost and misjudgment-free manner without affecting performance.

While the present invention has been described by means of specific embodiments, numerous modifications and variations could be made thereto by those skilled in the art without departing from the scope and spirit of the present invention set forth in the claims.

What is claimed is:

1. A method for preventing a file to be protected, from being copied, comprising:
executing a prevention of replication application on a host to enable a setting procedure, processing the file to be protected, and defining a supplementary protective zone after processing the file to be protected;
the prevention of replication application of the host notifying firmware of the storage medium, of a predetermined logical block address corresponding to the supplementary protective zone by means of a communication connection, so as to complete the setting procedure for preventing the file to be protected, from being copied; and
when the host performs a data copy operation and a data access address read by the host from the storage medium comprises a logical block address corresponding to the file to be protected and the predetermined logical block address, the firmware executing a pre-stored data blocking procedure, so as to prevent the file to be protected, from being copied by the host.

2. The method for preventing a file to be protected, from being copied according to claim 1, wherein the file to be protected is stored in at least one storage region of the storage medium.

3. The method for preventing a file to be protected, from being copied according to claim 2, wherein the data blocking program comprises:
causing the firmware to transmit false data to the host;
causing the firmware to continue transmitting the false data to the host such that the host cannot end the data copy operation;
causing the storage medium to not respond to any command from the host;
deleting data stored in the at least one storage region; and/or
formatting a portion or all of the storage medium so as to clear the data stored in the at least one storage region.

4. The method for preventing a file to be protected, from being copied according to claim 1, further comprising:
the host notifying the firmware of the storage medium by the prevention of replication application so as to disable the setting procedure.

5. A system for preventing a file to be protected, from being copied, comprising:
a host, installed with a prevention of replication application, for enabling or disabling a setting procedure, processing the file to be protected, and defining a supplementary protective zone after processing the file to be protected; and
a storage medium, in a communication connection with the host, the storage medium having a firmware and at least one storage region, the firmware allowing the prevention of replication application to set the supplementary protective zone and a data blocking procedure, the at least one storage region for storing the file to be protected;
wherein, the host notifies the firmware of the storage medium, of a predetermined logical block address corresponding to the supplementary protective zone by means of the communication connection, so as to complete the setting procedure for preventing the file to be protected, from being copied, and when the host performs a data copy operation and a data access address read by the host from the storage medium comprises a logical block address corresponding to the file to be protected and the predetermined logical block address, and the firmware executes the data blocking procedure that is pre-stored, so as to prevent the file to be protected, from being copied by the host.

6. The system for preventing a file to be protected, from being copied according to claim 5, wherein the data blocking program comprises:
causing the firmware to transmit false data to the host;

causing the firmware to continue transmitting the false data to the host such that the host cannot end the data copy operation;

causing the storage medium to not respond to any command from the host;

deleting data stored in the at least one storage region; and/or formatting a portion or all of the storage medium so as to clear the data stored in the at least one storage region.

7. The system for preventing a file to be protected, from being copied according to claim 5, wherein the host notifies the firmware of the storage medium by the prevention of replication application so as to disable the setting procedure.

8. A storage medium for preventing a file to be protected, from being copied, suitable to be in a communication connection with a host installed with a prevention of replication application; the host enabling or disabling a setting procedure by the prevention of replication application, processing the file to be protected, and defining a supplementary protective zone after processing the file to be protected; the storage medium comprising:

firmware, for allowing the prevention of replication application to set the supplementary protective zone, and a data blocking procedure; and at least one storage region, electrically connected to the firmware, for storing the file to be protected;

wherein, the prevention of replication application of the host notifies the firmware, of a predetermined logical block address corresponding to the supplementary protective zone by means of the communication connection, so as to complete the setting procedure for preventing the file to be protected, from being copied; when the host performs a data copy operation and a data access address read by the host from the storage medium comprises a logical block address corresponding to the file to be protected and the predetermined logical block address, the firmware executes the data blocking procedure that is pre-stored, so as to prevent the file to be protected, from being copied by the host.

9. The storage medium for preventing a file to be protected, from being copied according to claim 8, wherein the data blocking program comprises:

causing the firmware to transmit false data to the host;

causing the firmware to continue transmitting the false data to the host such that the host cannot end the data copy operation;

causing the storage medium to not respond to any command from the host;

deleting data stored in the at least one storage region; and/or formatting a portion or all of the storage medium so as to clear the data stored in the at least one storage region.

10. The storage medium for preventing a file to be protected, from being copied according to claim 8, wherein the host notifies the firmware of the storage medium by the prevention of replication applications so as to disable the setting procedure.

* * * * *